United States Patent
Saboff

(10) Patent No.: US 6,199,203 B1
(45) Date of Patent: Mar. 6, 2001

(54) MEMORY MANAGEMENT TECHNIQUES FOR ON-LINE REPLACEABLE SOFTWARE

(75) Inventor: Michael L. Saboff, San Jose, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/120,261

(22) Filed: Jul. 21, 1998

(51) Int. Cl.[7] .................................................. G06F 9/445
(52) U.S. Cl. ............................................. 717/11; 711/100
(58) Field of Search ...................... 717/3, 4, 11; 707/201, 202, 203; 713/2, 100; 709/332; 711/100, 147, 103, 148, 154

(56) References Cited

U.S. PATENT DOCUMENTS

| | | | |
|---|---|---|---|
| 5,838,981 | * 11/1998 | Gotoh | 395/712 |
| 5,854,937 | * 12/1998 | Woodward | 712/1 |
| 5,903,753 | * 5/1999 | Bramnick et al. | 395/712 |
| 5,922,072 | * 7/1999 | Hutchinson | 713/2 |
| 5,930,515 | * 7/1999 | Ducharme et al. | 395/712 |
| 5,933,646 | * 8/1999 | Hendrickson et al. | 395/712 |
| 5,937,198 | * 8/1999 | Nelson et al. | 395/712 |
| 5,960,445 | * 9/1999 | Tamori et al. | 707/203 |
| 5,991,544 | * 11/1999 | Godse | 395/712 |
| 6,014,725 | * 1/2000 | Kind et al. | 711/103 |

* cited by examiner

*Primary Examiner*—Kakali Chaki

(57) ABSTRACT

A system for managing the memory of a software component, such as a software library, such that the state of the software component is preserved after an update to the software component. There are two special types of memory allocated within the software component: transient memory and enduring memory. Memory needed to be preserved between two calls of the library is allocated as enduring memory. Transient memory persists until it is freed or when the software component is deleted, whichever comes first. Upon updating to a new version of a software component, the transient memory is released, while the enduring memory is preserved for use by the new version.

18 Claims, 13 Drawing Sheets

```
        func' (args)
    {
    10      if (version_in_registry ! = last_version)
    20          change_imp_lib(me);

30      jump (via table) to func /* in implementation lib */
    }
```

| Memory Type | Life of Allocated Objects | Uses |
|---|---|---|
| Static data | Until library is replaced | Library state information |
| Standard heap allocated data | Until freed | Memory to be freed by application |
| Heap allocated transient memory | Until freed or library is replaced | Library state information |
| Heap allocated enduring memory | Until free | • Objects allocated for the application<br>• Process state information |

FIG. 5

| Routine Name | Internal/ External | Purpose |
|---|---|---|
| change_imp_lib | Internal | Effect the change of implementation library |
| get_imp_lib | Internal | Load the implementation for the first time |
| get_version_ptr | Internal | Get pointer to implementation library version information |
| attach_imp_lib | External | Explicitly load an implementation library |
| release_imp_lib | External | Explicitly unload an implementation library |
| find_interface | External | Explicitly get pointer to implementation library function |

FIG. 6

| Routine Name | Purpose |
| --- | --- |
| void* e_first_ptr (Module_ID module); | Get first pointer to allocated enduring memory. Used to iterate through all enduring memory. |
| void e_free (Module_ID module, void* ptr); | Free enduring memory |
| void e_free_all (Module_ID module) | Free all enduring memory associated with a particular implementation library |
| void* e_malloc (Module_ID module, Allocation_ID id, size_t size, int* reuse); | Allocate enduring memory for module/id combination of "size" bytes. On entry, if the reuse parameter points to a non-zero integer, the memory may be reused. On exit, the integer pointed out by reuse will be non-zero if the returned memory is from a previous allocation. |
| void* e_next_ptr (Module_ID module); | Get next pointer to allocated enduring memory. Used to iterate through all enduring memory. |
| void t_free (Module_ID module, void* ptr); | Free transient memory |
| void t_free_all (Module_ID module); | Free all transient memory associated with a particular implementation library |
| void* t_malloc (Module_ID module, size_t size); | Allocate transient memory |

FIG. 7

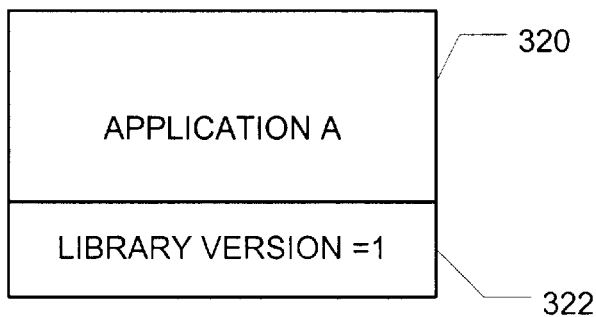
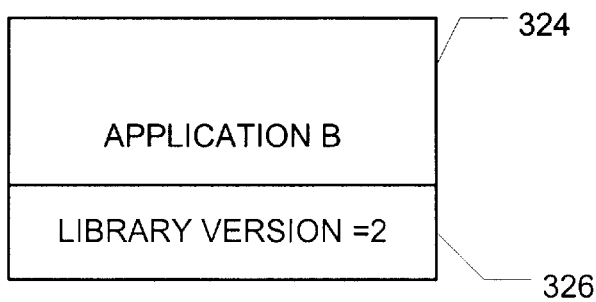
FIG. 12 (PRIOR ART)
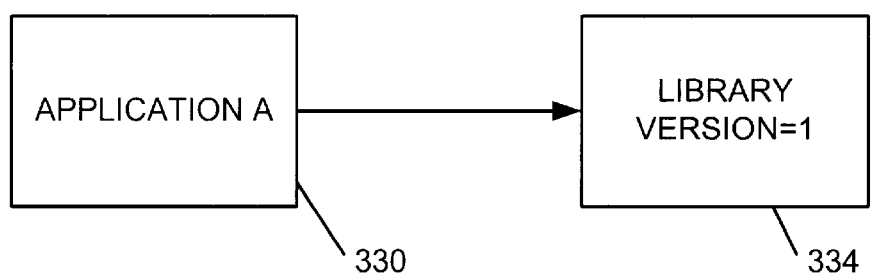
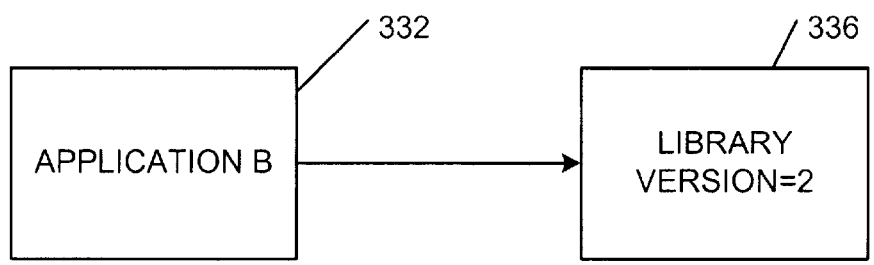
FIG. 13

Fig. 16

Fields in Registry Data Structures

| FIELD NAME | PURPOSE |
|---|---|
| 500—Base | (For rule entries) Pointer to base entry |
| 501—Criteria | Selection criteria for rules under a base entry |
| 502—Criteria Type | Type of rule - match user, group, process ID or variable value |
| 503—Criteria Value | Value to match for criteria to be satisfied |
| 504—Dependencies | The other services and their extensions that this service depends on |
| 505—Extensions | Additional capabilities provided by this version of the service. Provided as a list of extension UUID's |
| 506—ID | Unique ID for the base capabilities of the service |
| 507—Path | Location in the filing system for the file providing the service an ("implementation library") |
| 508—Rules | (For base entries) Pointer to linked list of sub rules under this base entry |
| 509—Service | The abstract name of the service provided by the registry entry. |
| 510—State | State of this entry -Default, Active, Inactive or Deleted |
| 511—Type | Type of entry -Library, Rule, Program, etc. |
| 512—UUID | Universal Unique IDentifier -128 bit unique value |
| 513—Version | System relative version of the service |
| 514—Prerequisite | The previous version, if any, of the software library that must have already be used by the application. Used to track incremental updates to a library. |

MEMORY MANAGEMENT TECHNIQUES FOR ON-LINE REPLACEABLE SOFTWARE

This application is related to the commonly-assigned application Ser. No. 09/120,040 filed concurrently and entitled SYSTEM AND METHOD FOR ON-LINE REPLACEMENT OF SOFTWARE.

BACKGROUND OF THE INVENTION

This invention relates generally to reducing down-time during software replacement and more particularly to the automatic dynamic updating of software.

Software components will need updating many times throughout their lifecycle. New versions of the software may be needed to repair bugs or to upgrade to an enhanced version of the software. Updating often results in downtime. As systems become more complex and software users become more dependent on a running system, downtime will become less and less acceptable.

For most software systems an update is performed by halting the system and installing the new version. Access to the software is unavailable during the upgrade. For many situations this is sufficient and only causes a minor inconvenience to a user of the software. In other situations the resulting delays are of greater inconvenience or even unacceptable.

Even if software can be upgraded on a system while it is running, most applications cannot take advantage of the updated software until the application is restarted, once again causing an inconvenience to a user.

Several systems have been developed to update software while the system is running. This ability is known by several names such as "on-line replacement" of software, updating software "on the fly", or "hot patching" software.

There are several known systems for updating software on the fly. One frequent drawback of known methods is the impact on the software applications. Software applications, in these methods, must be written so as to anticipate changes to the software components they use. If they are not written to anticipate the changes, then the entire program must be updated.

Current methods for on-the-fly replacement of software replace the software component at various levels of granularity. Some require the entire software program be replaced while others allow for much smaller units such a procedure or a module. Known methods are summarized in M. Segal and O. Frieder, "On-the-fly Program Modification: Systems for Dynamic Updating", IEEE Software, pages 53–65, vol. 10, no. 2, March 1993.

Libraries

The software components used by software applications are often found in software libraries, a group of software routines collected together, usually for a related purpose. The purpose of the library can be said to be the library's "service". Software libraries are made available to a software application through the use of a linker. A linker has the task of combining a series of independently compiled or assembled program routines into a single module (the executable program). Libraries are incorporated into the executable program by one of two linking methods: a library can either be statically linked or dynamically linked to the application. When a library is statically linked, the library in made part of the executable program during the link. Therefore any modifications to a statically linked library would require an new executable program to be built by the linker.

A dynamically linked library exists, on the other hand, outside of the executable program. At link time the linker must know all of the external references of a library, such as the names of the routines available, but does not need to know the actual contents of the library itself, or even its location. It is not until run-time that the program must be able to determine the location of the library. Determining the location of the library at runtime is known as "runtime binding". Therefore a dynamically linked library is free to change everything except its interface definition up until the time it is executed.

Dynamic linking, however, does not, by itself, provide true dynamic updating. It does not allow for changing a reference to an external procedure during a run after the references have been established. The binding takes place at or before the first time a procedure is invoked. Subsequent references are not typically rebound. Even if the external reference is resolved every time the external procedure is called, dynamic linking is ineffective because it does not allow for replacing a software component while that component is being executed. Also, changing libraries by dynamic linking does not keep track of the "state" of the library from the old version to the new version. When the new version is in place, it does not know the state of the library data structures or other state data that the old version had created. This will lead to an update that is unreliable to the user.

Therefore, there is a need for a system and method for replacing software components during a running process without significantly impacting the process.

Further, there is a need for a system and method for doing so that does not require changes to the software application using the replaceable software component.

Existing solutions do not replace software at the level of software libraries, and therefore do not take advantage of the built in dynamic linking capability found in many modem operating systems, such as Multics, HP/Apollo's Aegis, Sun Microsystems' SunOS 4.0, Microsoft's NT or Windows and HP's HP-UX system.

SUMMARY OF THE INVENTION

The present invention provides memory management techniques for on-line replaceable software. According to the invention, this is accomplished by creating two new types of memory: enduring memory and transient memory. Enduring memory will "endure" the replaceable software component and persist to be used by the updated version. Transient memory has its lifespan limited by the life of the replaceable software component it is allocated in. By conforming to the memory management scheme described in this invention, a software component will have its "state" preserved upon its update. By preserving a software component's state, the software component may be replaced while memory created by the old version and needed by the updated version will still exist for use by the updated version.

The memory management techniques describe in this invention allow for on-the-fly replacement of software component. These techniques will work for on-the-fly replacement of various software components. The software component may be of any granularity: it may be a software library or an entire software program. One expected use of the invention is when the software component is a dynamically linked kernel module. The application will illustrate the invention in the context of the replaceable software component being a software library.

The on-line replacement of a software library is accomplished by taking advantage of the dynamic linking capability available in many operating systems to replace software libraries while programs utilizing the libraries are executing. The on-line replacement will occur without noticeably impacting the running process. Further, the invention will allow library developers to design modifiable software that does not impose any special requirements on a software application that uses the library.

One aspect of the invention calls for abstracting the implementation of a library from its interface. A software application using a shared library requires the interface of the shared library, the data and symbols used externally, to be available in a bindable format. This format is provided by creating a new "proxy" interface library that the software application will link against. This interface library can be statically linked to the software application or it can be dynamically linked to the application. By creating a linkable interface library, the application has an interface it can bind with and fully discover all aspects of the library it needs to know to use the library. During execution, the application will call the interface library, which in turn will call the implementation library.

The implementation library contains the actual code providing the functionality or service of the library. The library provides this service through the series of routines. The implementation library is similar to a traditional shared library except that it must adhere to a few special requirements. First, it should not directly export any symbols to the application to prevent the application from binding with the implementation library. The application should only bind with the interface library, which in turn will interface with the implementation library. Second, the implementation library must manage its data such that the state of the library, i.e., the values of its local variable, can be restored when an update to the implementation library occurs. The preferred embodiment of the invention includes a series of memory allocation routines to be used by the implementation library in properly managing data so that it can be restored after an upgrade.

In addition to the interface and implementation libraries, there are two other major components to the invention: a registry and the management services. The registry contains an indication of the version, such as a version number, of the service provided by an implementation library. The management services make two sets of routines available to the implementation and interface libraries: library management services and memory management services. The library management services allow the interface library to manipulate the implementation library. The library management services ensure "program correctness." Program correctness is maintained by preventing an update at an incorrect time, such as when the application is already using an implementation library routine about to be changed.

The memory management services allow the implementation library and interface libraries to manage memory so as to preserve the state of the implementation library from the old version to the new version.

In operation, whenever the application invokes a routine found in the implementation library, control transfers to the proxy of the routine in the interface library. Before calling the actual routine in the implementation library, the interface library first checks the registry to see if the implementation library is due to be updated. If so updated, the library management services ensure that the implementation library is able to handle the change at this moment. When the implementation library is ready, (i.e., not in use) it is swapped out for its new version. The new version will restore the state of the old version using the memory management services and is then ready for use. The interface library then calls the updated routine in the new implementation library.

This system allows the application to employ the new implementation library at a time when it is convenient to the application. Prior art systems force the application to update at a specific time once the new library is ready. The use of a registry to signal to the application that a new version is ready allows the update to occur, not when the library is first updated, but at the next time the new library is accessed.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 5 is a table of memory types available to the implementation library of FIG. 2.

FIG. 6 is a table of library management services for managing the implementation libraries.

FIG. 7 is a table of memory management services available to the implementation library.

FIG. 12 is a block diagram showing a second prior art method of managing multiple versions of a software library.

FIG. 13 is a block diagram showing a method used by the present invention for managing multiple versions of a software library using the registry shown in FIG. 2.

FIG. 16 is a table describing the fields of the data structure of the registry shown in FIG. 15.

DETAILED DESCRIPTION OF THE DRAWINGS

Overview

Figure 1:
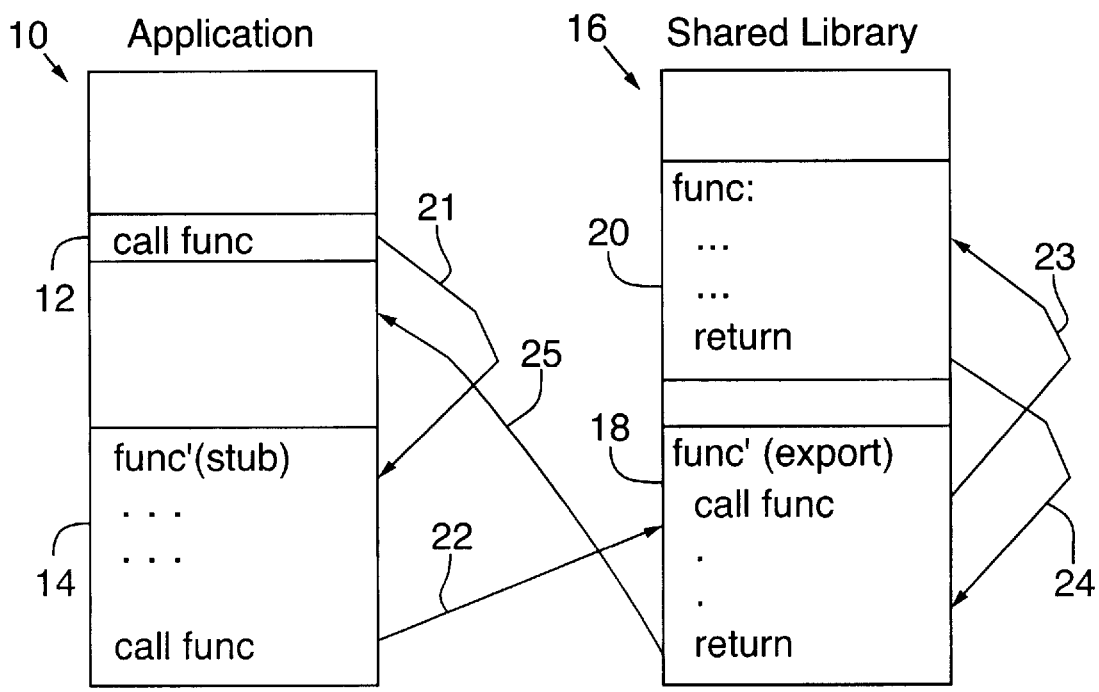
FIG. 1 is a block diagram showing a prior art shared library calling convention.

FIG. 1 is a block diagram showing a prior art shared library calling convention. Conventionally an application program 10 is connected to a shared library 16 using function call stubs exported by the shared library. The application is aware of the shared library function because it imported an import stub 14 when it was linked. The shared library has a corresponding export stub 18. The application 10 has a function call 12. When this call is executed, control is transferred 21 to the import stub in the application. The import stub then calls 22 the export stub 18 in the shared library, which the application locates at runtime by the process of binding. The export stub calls 23 the actual function 20 in the shared library. After execution of the function, control returns 24 to the export stub 18, which in turn returns control 25 to the application at the next location following the function call. In total there are five branches in the prior art protocol.

Figure 2:
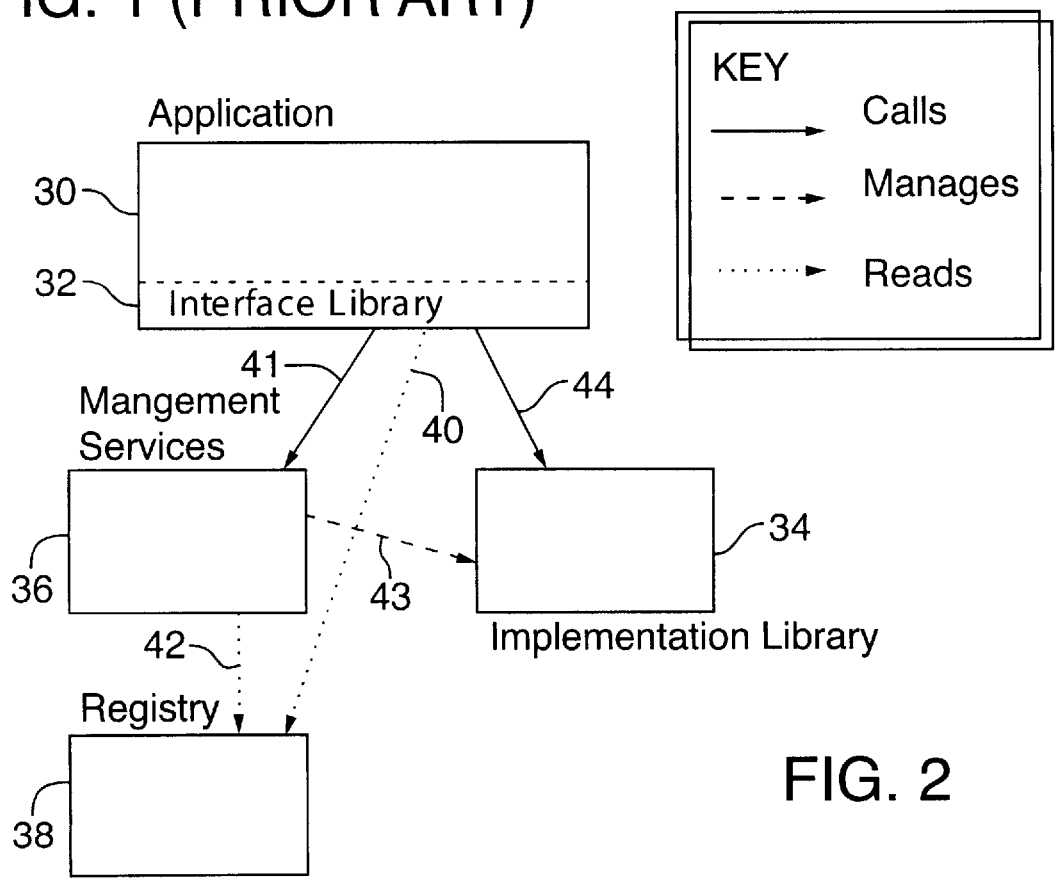
FIG. 2 is a block diagram of a replaceable library system.

FIG. 2 is a block diagram of a replaceable library system according to the present invention. According to the present invention, the functionality of a conventional shared library is divided into two libraries: an interface library 32 and an implementation library 34. The interface library 32 is linked with the application 30, either statically or dynamically. Static linking provides for less overhead in invoking the library routine, though dynamic linking may be preferable under some circumstances described below. The interface library will check 40 the registry 38 before calling the implementation library 34. If the registry indicates a change in the implementation library, the interface library will invoke 41 the management services 36 to update the implementation library after first ensuring 43 that the implementation library is not in use. The management services have read access 42 to the registry to determine the current version of the library. The management services also provide services to retain the state of the implementation library, so that after updating, the new implementation library can be restored to the old state. Once the implementation library has been swapped, the interface library can call 44 the implementation library.

The Interface Library

For every implementation library needed by an application, there is a corresponding interface library. The interface library contains a proxy interface for each of the routines in the implementation library. These proxy interfaces provide a true dynamic interface to the routines in the implementation library. Conventional calls to a run-time bindable shared library resolve the location of the shared library the first time the shared library is invoked and do not resolve them again on subsequent calls. This precludes any update of a shared library after the first call to the shared library. By contrast, the new interface library allows the implementation library to change location or content, or both, at any time during the execution of a program.

The interface library adds a layer of abstraction to the conventional process. This is compensated for, in the preferred embodiment of the invention, by using a modified calling convention shown in FIG. 3 and described below. It reduces the number of branch instructions to three, two of which are indirect. The new calling convention is completely contained within the interface and implementation libraries, and requires only a relinking of the application to the interface library to allow an application to take advantage of the improved calling convention. Thus, no changes to existing applications are needed for them to run successfully in a system that implements replaceable libraries according to the invention.

Figures 3, 4:
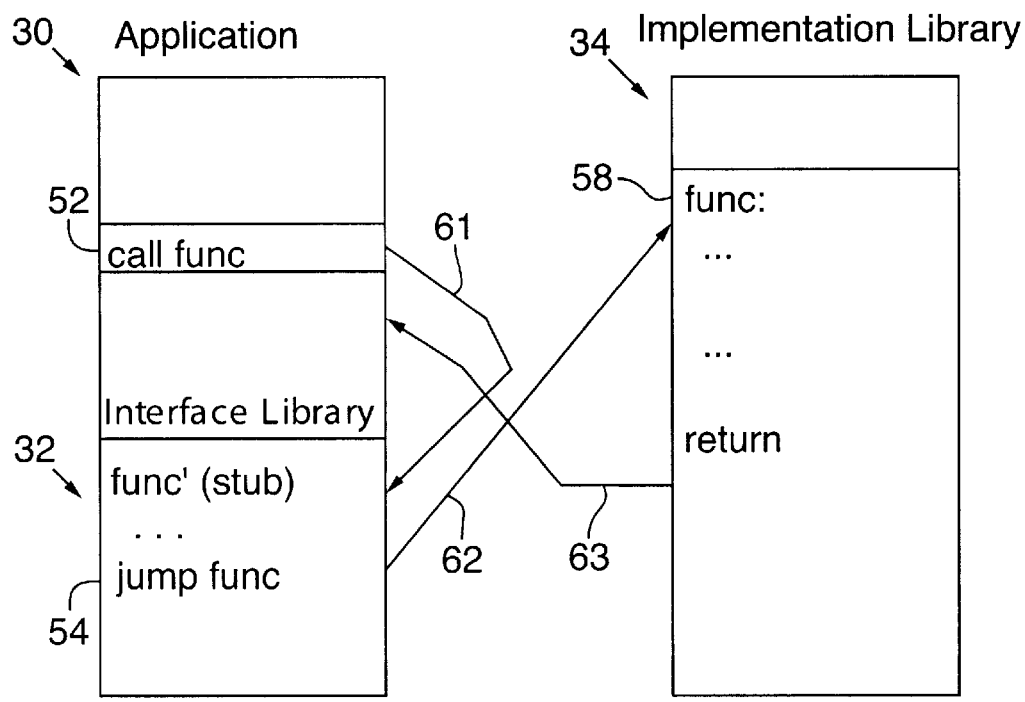
FIG. 3 is a block diagram of a library calling convention.
FIG. 4 is pseudo-code example of a proxy in the interface library of FIG. 2.

FIG. 3 is a block diagram of a library calling convention according to the present invention. The application 30 contains a call 52 to a function found in the implementation library. Responsive to that call, control transfers 61 from the application to a proxy 54 in the interface library 32. The interface library then calls 62 the actual function 58 in the implementation library 34. Upon execution of the function the control returns 63 to the application at the point following the function call.

Optionally, the proxy in the interface library can contain additional code after the call to the implementation library. If so, then the implementation library would need to return to the proxy call in the interface library to execute the additional code before the proxy call returns to the application at the point following the function call. This convention can be used, e.g., to place the code to detect the implementation library change following the call to the implementation library.

Another variation on this calling convention is to divide a "do forever" loop, e.g. a call-back loop, between the interface library and the implementation library. If the implementation library contains functionality that waits for some external event, such as a mouse click, the implementation library can periodically check to see if it is still the current version of the library. The interface library may contain a simple loop to check the registry to see if the running version of the implementation library is the current version. As long as the running implementation library remains the current version, the loop in the interface library will call the running version of the implementation library to perform the appropriate tasks. When a change of the implementation library is requested, the interface library will detect the change the next time it calls the implementation library. Before calling the implementation library, call the implementation library will invoke the library management services to update to the new version of the implementation library.

FIG. 4 is a pseudo-code example of a proxy routine in the interface library. The proxy first checks to see if the last used version of the implementation library matches the version recorded in the registry (line 10). If the versions do not match, the implementation library is due to be updated. A call is made to one of the library management services to update the implementation library (line 20) if necessary. The corresponding routine in the implementation library is called (line 30).

The interface library keeps track of the last used version of the implementation library that the application has used. At startup, this last used version can be set to the value currently in the registry. It could also be set to a null value, so that the first time a routine in an implementation library is accessed, the last used version would necessarily not match the version in the registry, the implementation library would be located for the first time, and the latest version would be used.

Binding a proxy routine in the interface library to a particular routine in the implementation library may require that the interface identifier be something other than the actual name of the routine, since future incompatible versions of the routine may later exist. This can be done, for example, by either using a version number in combination with the routine name, such as "strcpy$1," or using the Universal Unique Identifier (UUID) of each manifestation of the routine. Compilation will provide the means to map the simple name, such as "strcpy," to the compound name, such as "strcpy$1," or UUID. Either method generates a unique identifier for the interface, but could create problems for some language tools like debuggers.

The interface library, in addition to containing the proxy interfaces, contains global data associated with the implementation library. Making the global data in the interface library available to the application allows for direct access to the data by the application. This obviates the need for the application to relocate the data after an update of the implementation library. (We use "update" to include modification and replacement of an entire library.) The interface library can be created manually or could also be generated automatically from the implementation library.

The interface library, in a presently preferred embodiment, will be statically linked with the application. Statically linking the interface library to the application provides for the most direct and efficient calling of the actual routine in the implementation library. However, it may be useful to dynamically link the interface library to the application.

A software application already linked with a traditional calling convention, as shown in FIG. 1, can take advantage of the benefits of this invention without requiring relinking. The shared library, as indicated by reference 16 in FIG. 1, would not contain the implementation code, but could, instead, serve as the interface library. The interface library would then be conventionally run-time bound to the application, which is permissible since the interface library is not updated. The interface library would then call the implementation library. When the implementation library changes, the interface library can dynamically resolve the location of the implementation library just as it could when it was statically linked to the application. Though this method adds a layer of calling, it allows for applications linked in the conventional manner to take advantage of the dynamic updating of a library made available by this invention. In other words, the invention can be deployed by replacing a conventional library with a corresponding proxy interface library.

The Implementation Library

The implementation library contains code that actually provides the functionality of one or more routines. An implementation library is very similar to a conventional shared library except for certain restrictions on the exportation of its symbols, the use of data storage, its initialization, and the design of its interfaces for compatibility.

The implementation library should not directly export any symbols to the application, since the application may try to bind to those symbols. The only interface to the symbols of the implementation library is through the interface library. Any direct binding between the application and the implementation library defeats the purpose of this invention, since a change in location of the implementation library could not be found by the application and unloading of the old library would cause errors in the application. The implementation library should limit the exportation of data symbols to that which is absolutely necessary, such as the symbolic names of the library routines, the definition of the interfaces to the routines and the library version information.

Data storage in an implementation library must ensure that the state of the library is preserved between the old and the new version of the library. Requiring the implementation library to maintain a strict memory management discipline allows for the revision of the implementation library to be invisible to the application. The entire data state of the library will be restored when the library is updated reflecting all changes to the data made by the previous version of the library.

FIG. 5 is a table of memory types available to the implementation library. Memory within the library can be allocated in one of four ways. Two of these are conventional memory allocation types: statically allocated memory and heap allocated memory. Statically allocated memory is allocated at link time, not runtime, so any remains until the library is deleted from the system. The implementation library may use static memory for internal information. Any static data that will be shared between the implementation library and the application must be made part of the global data in the interface library. Heap allocated memory once allocated remains until it is de-allocated. Heap allocated memory will be used by the implementation library to create memory that is passed back to the application as a return parameter. The application then assumes the responsibility to deallocate it.

The invention uses two new, special types of memory, both of which are created on the heap. "Transient memory" persists until it is freed or when the library is deleted, whichever comes first. This should be used to store data within a library that does not need to remain after updates to the library. "Enduring memory" persists after the old library is deleted and the new library is created. Any data that is needed from one execution of a library routine to another should be allocated as enduring memory.

There is one additional special handling of memory. If an application allocates memory and passes that memory to the implementation library, the memory could be converted to either transient or enduring memory. After the conversion, the memory is managed by the implementation library.

One way to restore the state of the implementation library after an update is to transform the state during an initializing function, such as a constructor, that runs after the new library is loaded but before the application is allowed to access the library. The library might also have a destructor to clean up other transient states. There is no need to free transient memory allocated within the implementation library since library and memory management facilities already do that.

The implementation library will have an internal name, which is its service name, and an external name, or file name. When an interface library is updated, two versions of the implementation library will exist, at least temporarily. Both will have the same service name, but each will have a different file name. The interface library will know only of the service name, and the registry and management services will be responsible to find the proper implementation library. In the prior art, the application would know the file name and location of the shared library, and it would have to determine the new name and location of the shared library upon replacement.

The Registry

The registry allows for several versions of a software library to be used by several different applications within the same system. An application can be updated to a new version of the library without re-linking to the library or restarting. The preferred embodiment of the present invention uses a hierarchical registry, described herein, which is easy to manage due to its centralized nature. The registry also allows for great flexibility in the management of multiple libraries by offering the freedom for libraries to be deleted and updated on the fly without impacting applications.

Each version of a software library has a corresponding base entry in the registry. Generally, one base entry identifies a default software library to be used by an application calling the library's service, while one additional base entry exists for each additional version of a library service. Any base entry may have rules, each rule defining the conditions that must be met for an application to use the corresponding version of the software library. A base entry may have more than one rule or no rules at all. If there is more than one rule for a base entry, satisfaction of any rule meets the conditions to use that base entry. Typically, a default base entry will not have any rules and will be used when no other entry for a library service has its designated conditions met. A default entry may have rules, which if satisfied trigger the use of the default base entry. If no other base entries have their rules met, the default entry is used even if its rules aren't met. Each rule contains one or more criteria defining the rule. For a rule to be met, all of its criteria must be met.

When an application calls a service provided by a software library, the registry is queried to determine which version of the library to use. Each base entry that provides the requested service is checked to see if its rules are met. If the application fails to satisfy any of the base entries with rule entries, the default is used.

The hierarchical registry data structures and methodologies permit different users, groups, processes or environments to use different versions of the same library simultaneously. This can be done without relinking any applications. It further allows the use of debuggable, profiling, or experimental libraries for a particular user, group, process, or environment without disrupting or degrading the performance of other users, groups, processes, or environments on the system.

There are additional benefits of using a hierarchical registry. Since a hierarchical registry allows the use of libraries without relinking, it enables the use of a different library for an application even when the customer or user may not have the unlinked objects to the application available. The library no longer needs to be in a predetermined place in the file system; it can be moved around even after the application is linked. The hierarchical registry also simplifies system administration. With the hierarchical library registry, it becomes easy for an administrator to see which libraries will be used by various applications because this information resides in a central location. Additionally, a system that employs the registry does not require a system-wide change to a library. This allows more flexibility in the design, usage and deployment of libraries.

Figure 11:
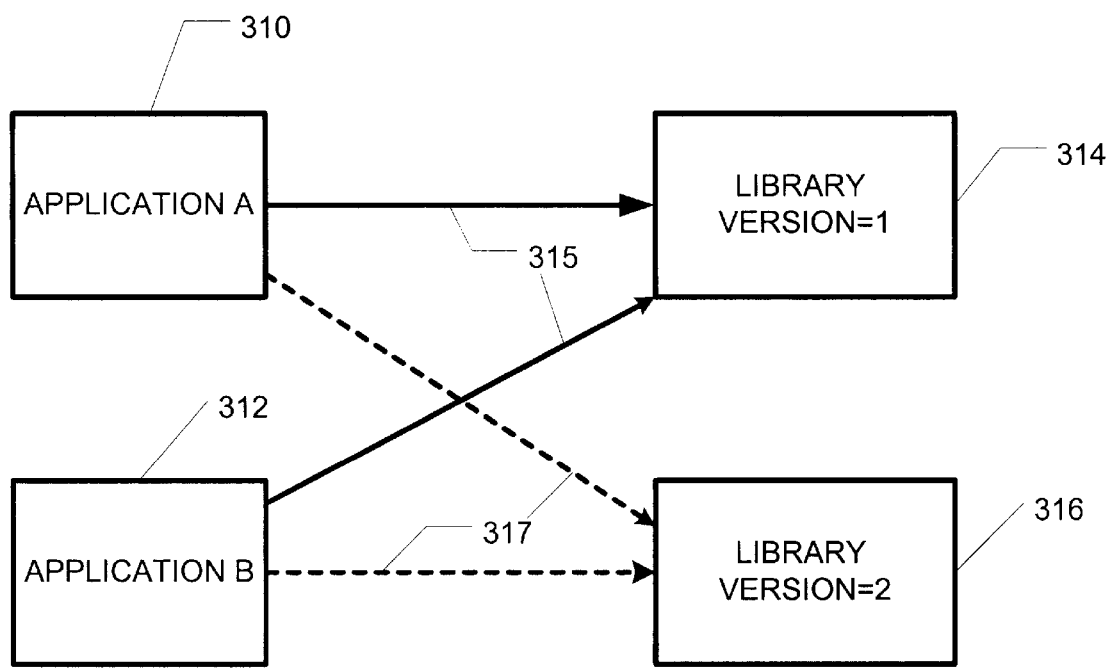
FIG. 11 is a block diagram showing a prior art method of managing multiple versions of a software library.

FIG. 11 is a block diagram showing a prior art method of managing multiple versions of a software library. Under this scheme of managing multiple versions of a software library, applications are dynamically linked to software libraries. All applications must use the same version of the dynamic linked library. In the diagram, Application A 310 and Application B 312 both use version 1 of the software library 314, as indicated by the solid arrows 315. If a second version of the software library is established on the system, it is ambiguous which version of the software library for each application to use. To use the second version of the software library 316, the second version will have to replace the first version of the software library 314 and both Application A and Application B will have to use version 2 of the software library 316, as indicated by the dashed lines 317.

FIG. 12 is a block diagram showing a second prior art method of managing multiple versions of a software library. Another method in the prior art of managing multiple versions of a library is statically linking the software library used by each application directly to the application. This method strictly specifies which library version is used by which application. But it is very inflexible because it forces a re-link with a new version of the library for every version change to an application. In the diagram, Application A 320 is statically linked with version 1 of the software library 322. Application B 324 is statically linked with version 2 of the software library 326. If Application A 320 would upgrade to version 2 of the software library 326, Application A must be re-linked with its own copy of version 2 of the software library 326, requiring the halting of Application A.

FIG. 13 is a block diagram showing a method used by the present invention for managing multiple versions of a software library using the registry shown in FIG. 2. In this system each application can use its own version of the library. In the diagram, Application A 330 uses version 1 of the software library 334. Application B 332 uses version 2 of the software library 336.

Figure 14:
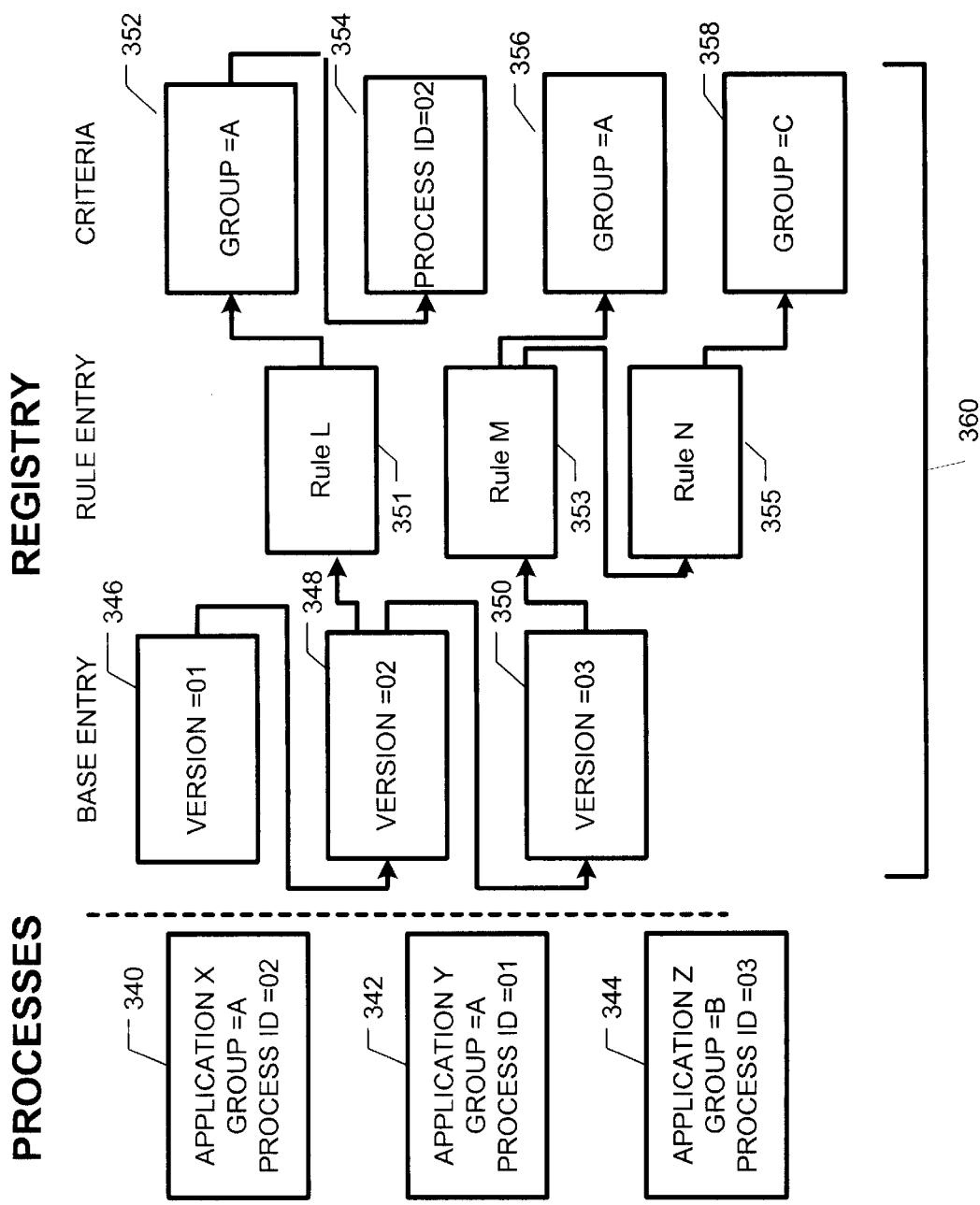
FIG. 14 is a block diagram showing the use of the registry shown in FIG. 2 to manage multiple versions of a software library.

FIG. 14 is a block diagram showing the use of the registry shown in FIG. 2 to manage multiple versions of a software library. To keep track of which application uses which version of the software a hierarchical registry 360 is used. The hierarchical registry 360 is made up of one base entry for every version of the software library service plus any rules used to select the desired version of the software library. Each rule includes one or more associated criteria that determine when the corresponding version of the software library is to be used. If all the associated criteria of a rule are met, then the version of the software library corresponding to that rule is used. Typically there will be a default version of the software library that has no rule associated with it. If no alternate base entry has any of its rules, the application will use the default version of the software. In the diagram, there are three applications and three different versions of the software library. Application X 340 is a member of group A and has a process ID of 1. Application Y 342 is a member of group A and has a process ID of 2. Application Z 344 is a member of group B and has a process ID of 3. Each application will access the hierarchical registry 360 to determine which version of the software library it will use.

A request is made from Application X 340 to the hierarchical registry 360 to determine the version of the software library for it to use. There are three base entries offering the software library service. The first base entry 346 represents the default version and has no rules associated with it. The second base entry 348 has one rule, Rule L 351, associated with it. Rule L has two criteria: the first criteria 352 indicates that to use the second base entry 348, the calling application must be from group A; while the second criteria 354 requires that the calling application have a process ID of 1. Since Application X meets both of the criteria for the second base entry 348, the version associated with the second base entry 348 is used. In this case the second base entry 348 is associated with version 2 of the software library. Application X 340 will therefore use version 2 of the software library.

A request is made from Application Y 342 to the hierarchical registry 360 to determine the version of the software library for it to use. There are three base entries offering the software library service. The first base entry 346 represents the default version and has no rules associated with it. The second base entry 348 has one rule, Rule L 351, associated with it. Rule L has two criteria: the first criteria 352 indicates that to use the second base entry 348, the calling application must be from group A; while the second criteria 354 requires that the calling application have a process ID of 1. Though Application Y342 meets the first criterion of the rule entry it does not meet the second criterion. Therefore, the hierarchical registry keeps checking, proceeding to the third base entry 350. The third base entry 350 has two rules associated with it, Rule M 353 and Rule N 355. If either of the rules are satisfied, then the third base entry 350 is the desired version of the software library. Rule M 353 has one criterion 356, that the application using it is from group A. Since Application Y meets the sole criterion for at least one of the rules of the third base entry 350, the library version associated with the third base entry 350 is used. In this case the third base entry 350 is associated with version 3 of the software library. Application Y 342 will therefore use version 3 of the software library.

A request is made from Application Z 344 to the hierarchical registry 360 to determine the version of the software library for it to use. There are three base entries offering the software library service. The first base entry 346 represents the default version and has no rules associated with it. The second base entry 348 has one rule, Rule L351, associated with it. Rule L 351 has two criteria: the first criteria 352 indicates that to use the second base entry 348, the calling application must be from group A; while the second criteria 354 requires that the calling application have a process ID of 1. Application Z 344 meets neither of the criterion of Rule L 351. Therefore, the hierarchical registry keeps checking, proceeding to the third base entry 350. The third base entry 350 has two rules associated with it, Rule M 353 and Rule N 355. If either of the rules are satisfied, then the third base entry 350 is the desired version of the software library. Rule M 353 has one criterion 356, that the application using it is from group A. Application Z fails to meet the criterion for the Rule M 353. Application Z 344 also fails to meet the sole criterion for Rule N 355, that the application come from group C. Since no rules associated with the third base entry 350 are met, it is not the desired version of the software service. Since there are no further base entries offering the desired software service, the default version identified by the first base entry 346 is used. Application Z 344 will therefore use version 1 of the software library.

Figure 15:
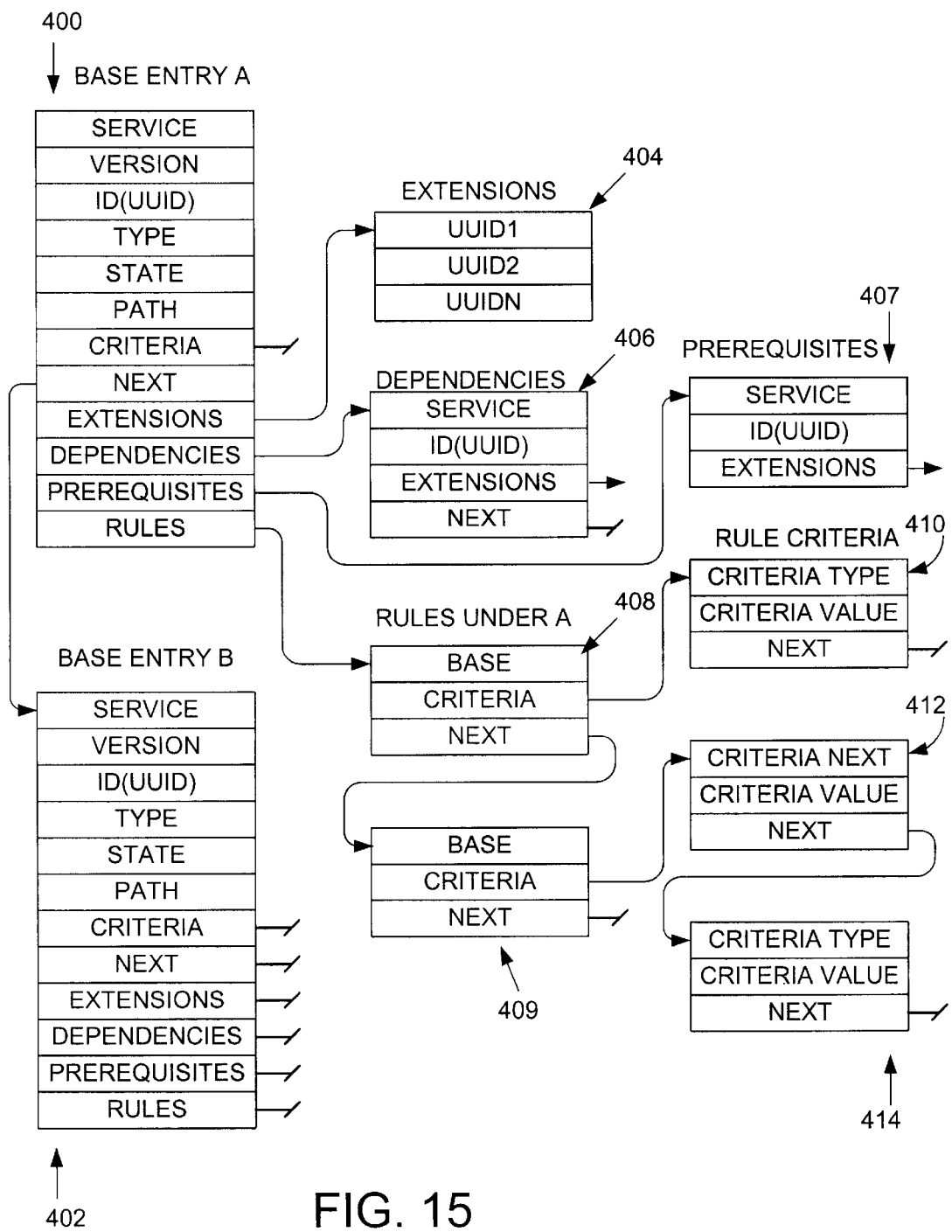
FIG. 15 is a diagram of the data structure of the elements of the hierarchical registry shown in FIG. 14.

FIG. 15 is a diagram of a sample data structure for implementing the hierarchical registry shown in FIG. 14. The hierarchical registry is comprised of several levels of linked lists. Other data structures for relating groups of objects could be used, but a presently preferred embodiment of the invention uses linked lists. The top level in the data structure is a linked list of all base entries. Each software library service has one or more corresponding base entries. The base entry contains information about each version of the software library providing the service. The information in the base entry includes the version number and the path in the file system for the corresponding version of the software library. Each base entry has a "rules pointer", pointing to a list of rules that apply to the base entry. If the "rules pointer" is null, there are no rules defining the use of that version of the software library.

The list of rules is the second level of linked lists. The list comprises one entry for each rule associated with a base entry. For example, if any one of four conditions could be met to use a version of the software library, then there would be four rule entries. However, if there are four conditions that must be met to use a version of the software library, there would be only one rule with four criteria. Each rule contains a pointer back to its base, the base entry that it applies to. Each rule has a "criteria pointer" pointing to the third level of link lists, the criteria necessary for using the version associated the rule entry. Every rule entry must have at least one rule criterion. A rule entry may have more than one rule criterion. For a rule entry to be selected, every criteria associated with the rule entry must be satisfied.

Each criteria entry contains a criteria defined by criteria type and criteria value fields. The criteria sets various restrictions on the use of the version of the software library associated with the rule entry. As examples, the criteria may be require the application to have a specific process ID; the criteria may require the application to be of a specific group of applications; or the criteria may require that only processes run by a specific user may use this version.

In the diagram of FIG. 15, there are two base entries: Base Entry A 400, and Base Entry B 402, each identifying a separate version of a software library service. Base Entry A 400 has two associated rule entries, a first rule 408 and a second rule 409. The first rule 408 has one rule criteria 410 associated with it, indicating a condition to be met to satisfy the first rule. The second rule 409 has two rule criteria 412, 414 associated with it, indicating two conditions to be met to satisfy the second rule. If the criteria for either the first or the second rules are met, then the software library version indicated in Base Entry A 400 is the desired version.

Base Entry B 402 has a null "rules pointer", indicating that there are no rule entries associated with it. Base Entry B 402, therefore, needs no special conditions to be met for its use. Provided that Base Entry B 402 indicates a usable version of the software library (that is, for example, that it has not been marked as inactive or deleted, as described later) it will be selected by applications that do not meet the rules imposed by Base Entry A 400. If there were several base entries that contain rules, the first base entry encountered that has one of its rules met will provide the service.

The hierarchical registry structure provides flexibility by providing links to software components related to an entry. These links may be extensions, dependencies or prerequisites. The extensions, dependencies and prerequisite links provide convenience to the user of the registry to find related software components. With multiple versions of software libraries available, the use of extensions, dependencies and prerequisites can avoid much confusion.

If the software library associated with an entry has additional capabilities available to a user of the service, the extensions pointer will point to an extensions list. The extensions list is a collection of unique identifiers of the files providing the additional capabilities. For example, the software library may provide for the trigonometry functions of sine and cosine. There may be an extended file that provides additional trigonometry functions of arcsine and arccosine. The extensions list for an entry will have an identifier for the file containing the arcsine and arccosine functions. Though each version of a software library could possibly have a different set of extensions, each new version of a software library would likely have all the extensions of the previous version. In FIG. 15, Base Entry A 400 has a set of extensions 404, containing unique identifiers for all additional capabilities provided by the service. Base entry B 402 has no extensions, so its extension pointer is null.

Each base entry may also have dependencies. Dependencies refer to software files that are used by the version of the software library indicated by the base entry and therefore must be loaded and present. The base entry includes a dependency pointer pointing to a dependency block. The dependency block includes the identifiers and the service names for the services that the base entry depends on. Each dependency has a next pointer that points to a subsequent dependency for the base entry, if any. A dependency may also have extensions for the additional capabilities required of the service. Though each version of a software library could possibly have different dependencies, each new version of a software library would likely have all the dependencies of the previous version. When an application replaces a library, all libraries that the replaced library depends upon are also replaced for the application. This ensures a consistent set of libraries for use by an application. In FIG. 15, Base Entry A 400 has a dependency 406, indicating a service that the base entry depends on. Base entry B 402 has no dependencies, so its dependency pointer is null.

Each base entry may also have a prerequisite. Prerequisites are used to track incremental updates of libraries. A library that is not an incremental update from a previous library will not have a prerequisite. A library that is incrementally built off of another library, or chain of libraries will have as a prerequisite the latest version of the library that the application must have already loaded. For example, if version 3 of a library is designed to be updated only from version 2, which is designed to be updated from version 1, version 3 will have a prerequisite of 2. If an application is currently using version 1 of the library, an update to version 3 will not be allowed, because the application has never gone through the update to version 2. If however, version 3 was designed to be updated from version 1, version 3 will have a prerequisite of version 1 and an update from version 1 to version 3 for an application will be allowed. The prerequisite block contains a service name and a unique identifier indicating the prerequisite version of the library, if any. The prerequisite block also contains a pointer to extensions that list unique identifiers of files providing further capabilities of the prerequisite file.

FIG. 16 is a table describing the fields of the data structure of the registry shown in FIG. 15. There are five data structure types: the base entry structure, the rule criteria structure, the extension structure, the prerequisite structure and the dependency structure, each described in turn below.

A rule structure has a base pointer 500, which is used by rule structures to point back to the corresponding base entry.

Criteria pointer 501 is used only by rule structures to point to rule criteria that must be met for the rule of a base entry to be satisfied. A rule will have at least one rule criteria.

Criteria type 502 indicates the type of rule that the rule criteria structure refers to. Possible types include, but are not limited to, a user id, a group id, a process ID or a variable value.

Criteria value 503 indicates the value that must be matched for the criteria to be met. The meaning of this criteria value is dependent upon the criteria type 502. For example, the criteria value indicates a process ID if the criteria type is set to a type of process ID.

Dependency pointer 504 is used by base entries. A dependency pointer points to a dependency structure indicating other files and their extensions that the entry depends on.

Extensions pointer 505 is used by base entries. Extension pointers can also be used in dependency structures and prerequisite structures. An extension pointer 505 points to an extension structure indicating additional capabilities available for service provided in the entry, or described in the dependant service or the prerequisite service. Each extension in an extension structure is expressed as a unique identifier, such as a Universal Unique Identifier (UUID).

Identifier 506 is used by base entries to uniquely identify the service of the software library associated with the entry structure. Each identifier is a unique identifier, such as a Universal Unique Identifier (UUID).

Path 507 is used by base entries to indicate the location of the file providing the corresponding version of the service for this entry.

"Rules pointer" 508 is used only by base entries, to point to the first of the corresponding rules. If the base has no corresponding rules, the rules pointer is null.

Service 509 is used by base entries as well as by the dependency structure and the prerequisite structure. The service field indicates the abstract name of the service provided by the software library. All versions of a software library, including prerequisites for a software library, provide the same service, so the service field should match for all base entries and prerequisites associated with a software service.

State 510 is used by base entries indicating the state of the entry. Possible states include default, active, inactive or deleted. An entry will typically have a state of "active" or "default". When first loading a library onto the system and opening an entry in the registry for the library, the system administrator may wish to mark the library's entry state as "inactive" until it is ready for use. When a library is going to be deleted, the system administrator may mark the library's entry state as "deleted", so that no new users will access the library, but current users can finish use of the library. If a base entry state is marked as "inactive" or "deleted" there must be another base entry to provide the default for the system.

Type 511 is used by base entries to indicate the type of this entry. This field may be used to identify the granularity of the software component managed, such as "program" or "library" or "routine". Since the registry structure is generic to manage multiple versions of a software component, whether it is a routine, a library or an executable program, this field may be used to indicate the granularity used.

Several structures use a UUID field 512. An extension structure uses it to indicate further capabilities provided by a version of the software library. A dependency structure uses it to indicate other software libraries that the software library depends on. A prerequisite structure uses it to indicate a previous version of a software library that must have been loaded by an application prior to using the base entry. All entry structures use the UUID to uniquely identify the software library indicated by the entry. Any of these fields may use a system of uniquely identifying a software unit. One way of uniquely identifying a software unit is to use the Universal Unique Identifier (UUID), a system of identification using a 128 bit unique value.

An entry structure has a version 513, which is used by base entries indicating the version number of the version of the software library in this entry.

Prerequisite pointer 514 is used by base entries. A prerequisite pointer points to a prerequisite structure indicating a previous version of the service.

The Management Services

The management services contain two sets of services, the library management services and the memory management services. The library management services are available to the application and to the interface library to manage the implementation library. The memory management services are used generally by the implementation library routines to ensure the proper allocation of memory types, described above, so that the library can preserve its state upon updating.

The Library Management Services

FIG. 6 is a table of library management services to manage the implementation library. The table contains a sample list of routines to manage the implementation library. Routines indicated as internal are expected to be used by the interface library itself to request the loading or modification of the implementation library used by the application. Routines indicated as external are expected to be used by external loading software to explicitly load and unload implementation libraries to and from memory. The means for managing the loading and unloading of implementation libraries while maintaining program correctness is provided for by the library management services.

The most significant of the library management services is the request to change the implementation library, indicated in the table by the routine "change_imp_lib." Changing the implementation library must be done while preserving "program correctness". Once the request for the update has been made, all subsequent requests to use the implementation library must be placed on hold until the implementation library has been updated. All current requests to use an implementation library routine that have already begun must be completed. This includes any threads of execution that have started but have not yet been completed. This also includes tracing back the stack to ensure that even if the implementation library routine has completed its operation, it has not recursively called itself and is not therefore still in mid-operation at a higher level. The library management services must also ensure through all this, that the application does not timeout while the update is pending. It can do this, for example, by returning control to the application periodically while indicating that the application's request to execute has not yet been performed.

The Memory Management Services

Memory needs to be managed so that the state of the implementation library can be recovered after the implementation library has been changed. This management could be done by services within the implementation library, but is optimally done by the use of external memory management services available to the all versions of the implementation library. The means for managing the memory allocation of the implementation library so that the state of the implementation library can be restored upon update of the implementation library is provided for by the memory management services. The state of the implementation is collection of all state variables, software data that is essential from one execution of a implementation library routine to another.

FIG. 7 is a table of memory management services available to the implementation library and the library management services. The memory management services are used by the implementation library routines to ensure the proper allocation of memory types, described above, so that the library can preserve its state upon updating. The implementation library incorporates a discipline of allocating all heap memory as one of two types of memory: transient memory or enduring memory. In one embodiment of the invention, the two types of memory are managed by linked lists, though other data structures could be used as well. The memory management services must be used by the implementation library for the allocation of all memory to ensure that the state of the library can be recovered after swapping a library.

The memory management services include memory allocation services, such as e_malloc and t_malloc, as well as memory de-allocation services, such as e_free, e_free_all, t_free and t_free_all. These allocation services add a layer of memory management on top of the system memory allocation functions. When the implementation routine needs to allocate or free memory, it should not call the system memory allocation functions, such the malloc and free routines used in C, but instead, should call the memory management services.

The memory management services also contain routines to help navigate the two memory data structures. The functions include e_first_ptr and e_next_ptr. After the update of a library the enduring memory of the old library must be restored for the new library. These routines are used to iterate through the enduring memory to "pre-process" a newly loaded library to ensure that the enduring state is properly restored.

Figure 8:
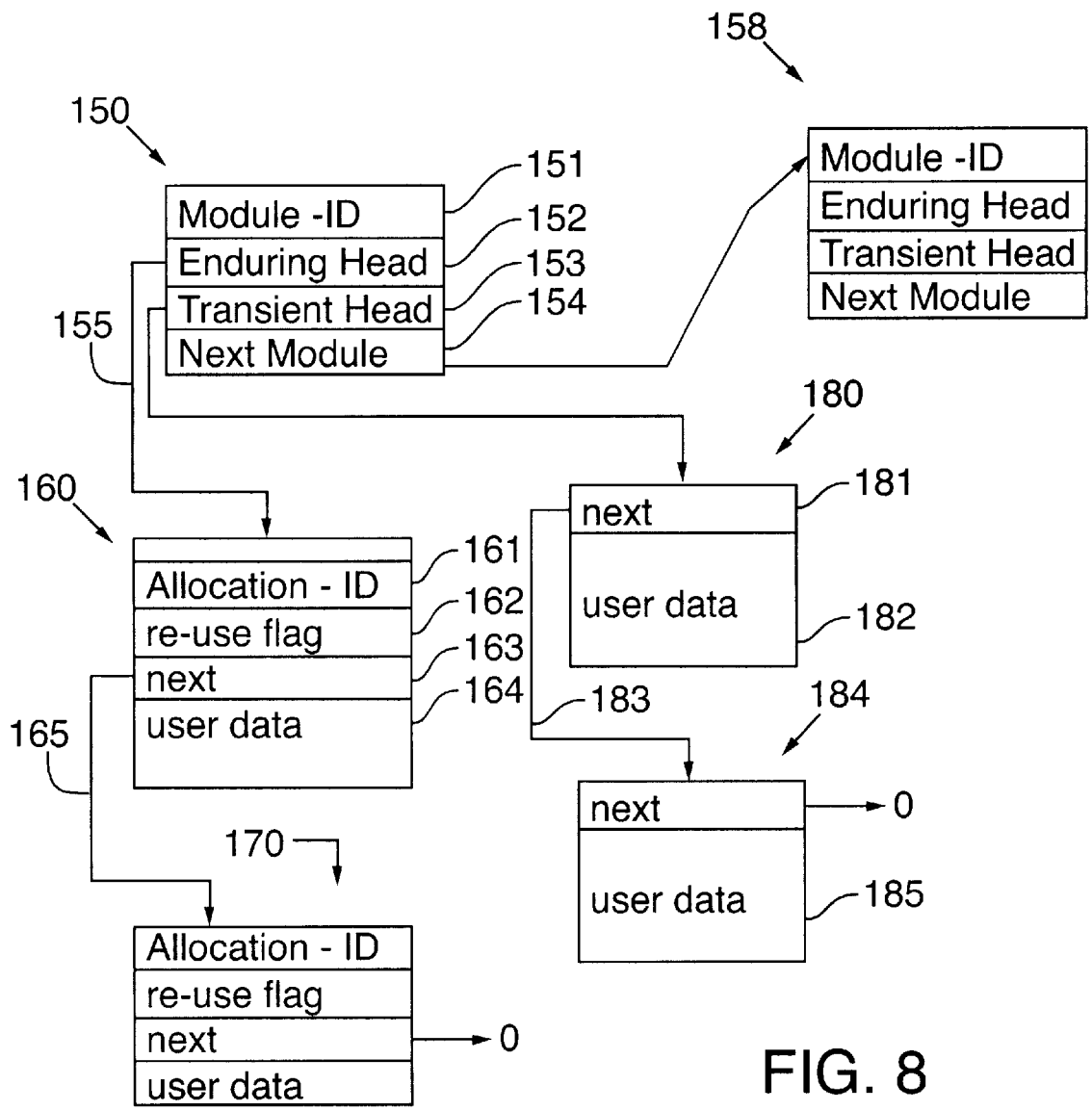
FIG. 8 is a block diagram showing a linked list implementation of the memory management scheme for the implementation library.

FIG. 8 is a block diagram showing a linked list implementation of the memory management scheme for the implementation library. Each replaceable implementation library has two sets of data: transient data and enduring data.

Each implementation library contains a module header block 150. In the header block 150 is a module ID 151; an enduring head pointer 152, pointing 155 to the head of a link list managing the enduring data 160; a transient head pointer 153 pointing 156 to the head of a link list managing the transient data 180; and a next module pointer 154, pointing 157 to the next module header block 158.

Each block of data allocated as enduring data contains an enduring data header block 160, prepended to each segment of enduring memory 164 allocated by the implementation library. Each enduring data header block contains an allocation ID 161, an identifier unique within the library; a re-use flag 162; and a next pointer 163, pointing 165 to the enduring data header block 170 for the next segment of allocated enduring memory.

Each block of data allocated as transient data contains a transient data header block 180, prepended to each segment of transient memory 182 allocated by the implementation library. Each transient data header block contains a next pointer 181, pointing 183 to the transient data header block 184 for the next segment of allocated transient memory 185.

An additional allocation feature is available when allocating enduring memory. By designating an allocation ID when allocating memory, the specific segment of memory allocated will be marked with that allocation ID. If a subsequent request to allocate memory with the same allocation ID is accompanied with a reuse flag set to TRUE, the system does not allocate new memory. Instead it returns a pointer to the old memory segment allocated with the same allocation ID, provided the memory has not been freed. This will be useful after a library replacement to get a pointer to a memory segment when it is unclear if the old library has already allocated the memory. If it has, the allocation IDs will match and no new memory will be allocated. If it has not, no allocation ID will match and new memory will be allocated.

The memory management services may also be used by the library management services. For example, upon freeing the use of an implementation library with a request to change the implementation library, the library management services will free all transient memory by calling the t_free_all routine, a memory management service.

Operation

Figure 9:
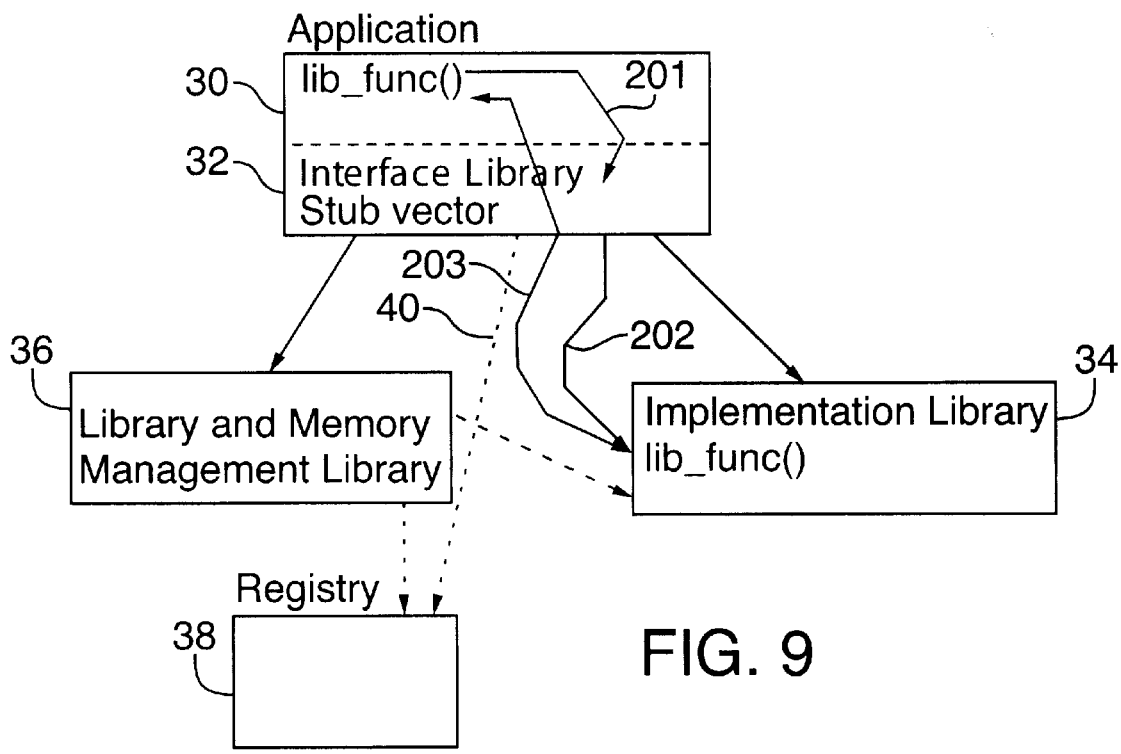
FIG. 9 is a block diagram of the operation when the implementation library has not been updated.

FIG. 9 is a block diagram of the operation of the invention when the implementation library has not been updated. FIG. 9 uses the same key used in FIG. 2. The application code 30 makes a call to a function found in the implementation library 34. The control goes first to the proxy of the function found in the interface library 32, as indicated by line 201. The interface library reads 40 the registry 38 and finds that the version of the function in the library is currently up to date. The interface library proxy transfers control to the actual function in the implementation library, as indicated by line 202. Upon completion of the function, control returns to the application at the point following the call to the function, as indicated by line 203.

Figure 10:
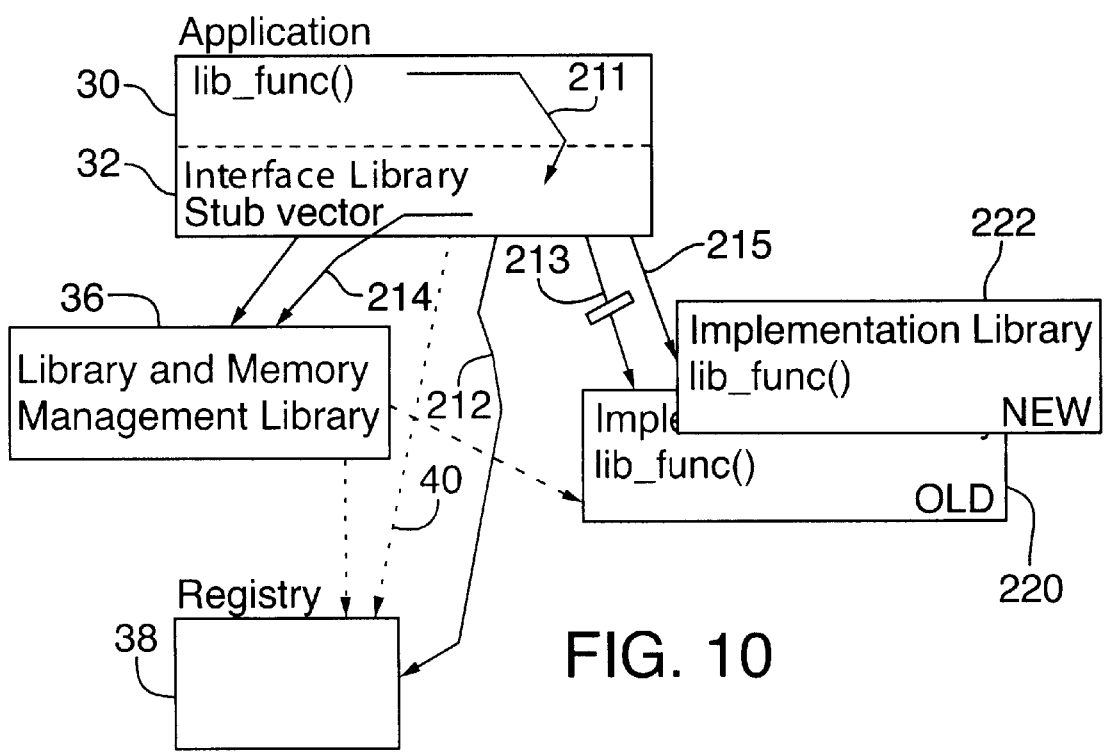
FIG. 10 is a block diagram of the operation when the implementation library has been updated.

FIG. 10 is a block diagram of the operation of the invention when a request to update the implementation library is pending. FIG. 10 uses the same key used in FIG. 2. The application code 30 makes a call to a function found in the implementation library 220. Control goes first to the proxy of the function found in the interface library 32, as indicated by line 211. The interface library reads 40 the registry 38, as indicated by line 212, and finds that the latest version of the implementation library is different than the version last used by the application. This indicates that there is a newer version of the implementation library on the system. Thus the call to the old version of the implementation library 220, as indicated by line 213, is obsolete.

Instead, execute the new version of the implementation library 222, as indicated by line 215. To do this, the interface library proxy calls the management services to change the implementation library used by the application, as indicated by line 214. The management services waits until the implementation library is no longer being accessed and then updates it to the new library. The management services also ensures that the state of the implementation library is preserved from the old implementation library to the new implementation library. Once the new implementation library 222 is updated, the interface library calls the new implementation library, as indicated by line 215.

The invention has a design goal to only allow for interface changes that are upward compatible, that is, an application written with the old interface will still be able to use a new implementation library with the old interface. However, an application written for and linked with the new interface library will not be able to use an implementation library providing new capabilities. Implementation library providers that meet this design goal will provide libraries that will preserve application program compatibility with existing software while still being able to offer upgraded libraries for use by future software.

Pointer Linkage Table

The preferred embodiment of the present invention optimizes the process described above by keeping a pointer for most current version of the implementation library, if possible, therefore eliminating the need to branch to the proxy interface except when the implementation library has been updated. This optimization eliminates unnecessary jumps in software and therefore, makes calling the implementation library more efficient. In the preferred embodiment, a pointer linkage table, keeps an address pointer of the desired location for the application to branch to, to find the most recent version of the implementation library.

Figure 17:
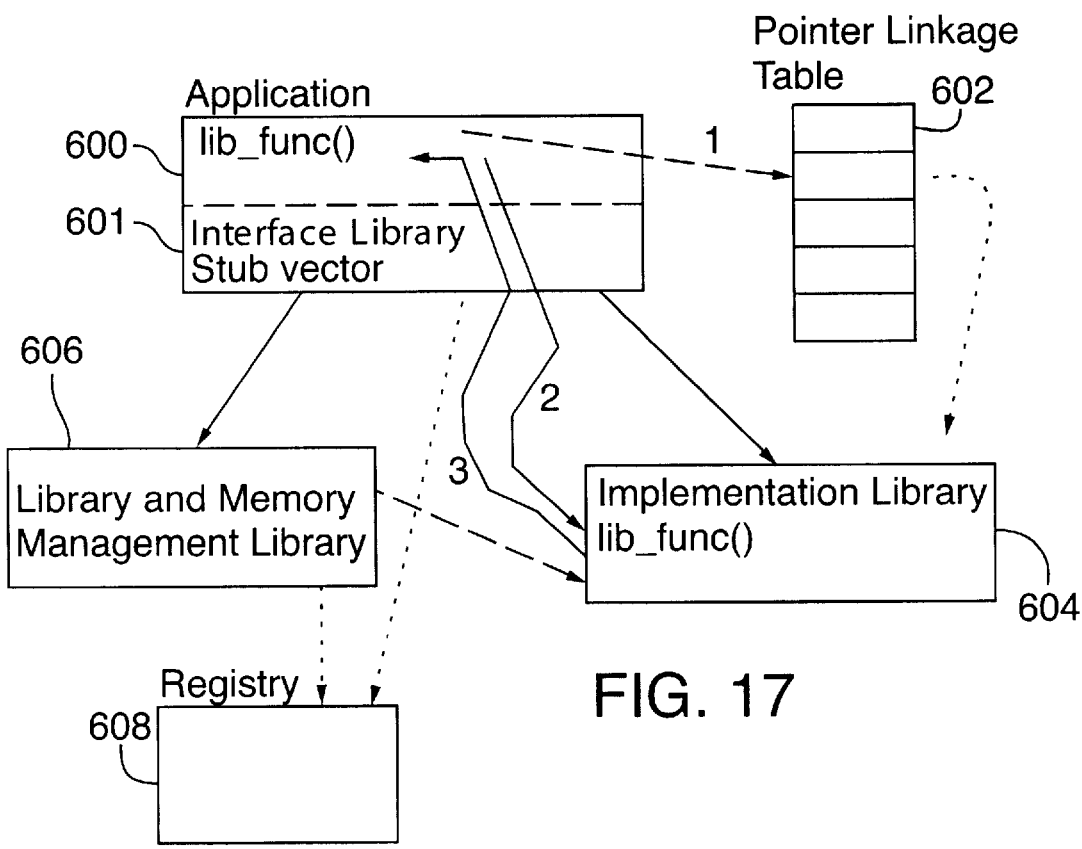
FIG. 17 is a block diagram of a replaceable library system using a pointer linkage table to avoid the call to the interface library.

As shown in FIG. 17, the application 600, upon executing code calling a function in the implementation library 604, retrieves an address for the function from the pointer linkage table 602. The pointer linkage table has an entry for every function in an implementation library 604. If the implementation library 604 has not changed since the last time it was called, the entry in the pointer linkage table 602 will still have the address as of the last call to the function. The application will then call the existing implementation library 604 directly without branching to the interface library.

Figure 18:
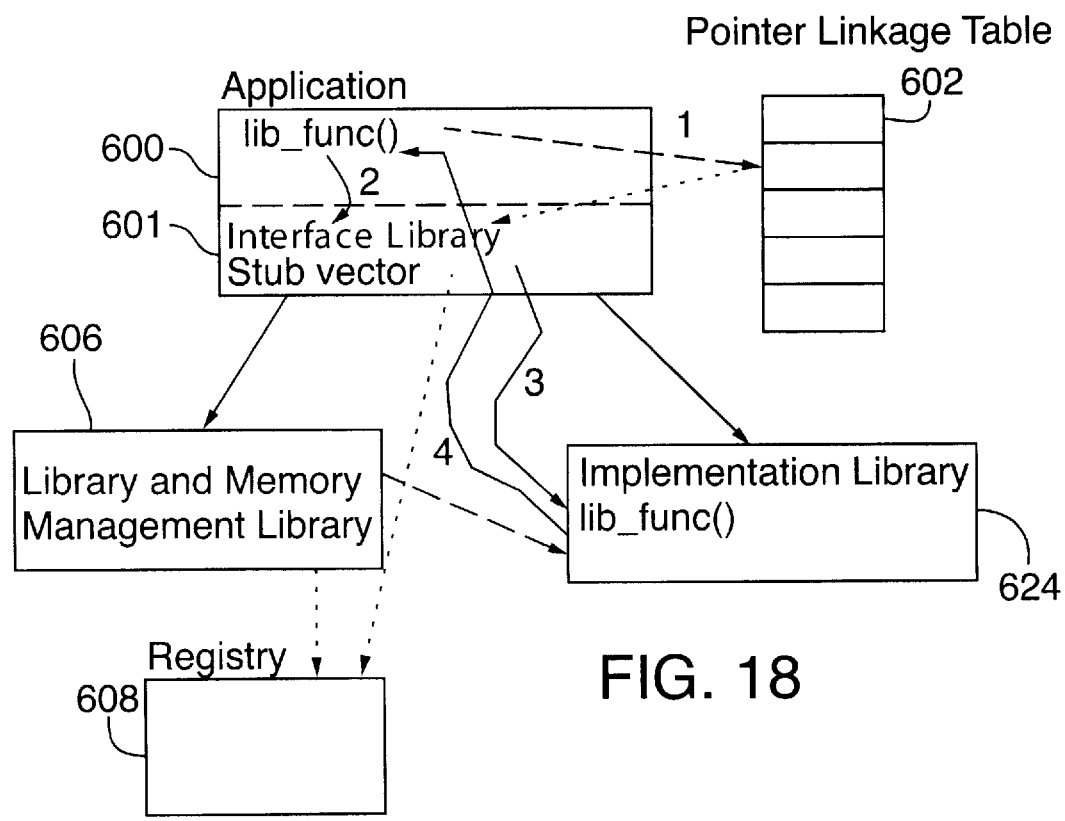
FIG. 18 is a block diagram of a replaceable library system using a pointer linkage table to make the call to the interface library.

However, if the implementation library has changed, the library and memory management libraries 606 will receive a signal indicating the change. As shown in FIG. 18, the library management library will need to determine if the old version of the implementation library is in use. If it is, the pointer linkage table 602, is updated to point to the proxy interface in the interface library 601, leading to the application 600 calling the proxy interface in the interface library 601, which will handle the change of the implementation library 624 as described above. Upon completion of the update, the pointer linkage table is updated to point to the new version of the implementation library 624. If the implementation library is not currently in use, the new interface library 624 will be loaded, the old library destroyed and the pointer linkage table 602 then updated to point to the new implementation library 604, once again bypassing the proxy interface in the interface library 601.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A computer program stored in a machine-readable form for managing memory in a digital computer to support the replacing of a software component, the program comprising:
    a means for allocating a block of memory as enduring memory for use by a software component;
    a means for deallocating a block of memory previously allocated as enduring memory; and
    an enduring memory data structure comprising zero or more enduring memory entries, each enduring memory entry indicating enduring memory allocated by the allocating means and not yet deallocated by the deallocating means, the enduring memory data structure accessible by the software component after the replacement of the software component, so as to allow the software component access to enduring memory allocated before the replacement.

2. A program according to claim 1, further comprising a means for re-establishing after the replacement of the software component a connection to enduring memory allocated before the replacement.

3. A program according to claim 1, further comprising:
    a second allocating means for allocating a block of memory as transient memory for use by a software component;
    a second deallocating means for deallocating a block of memory previously allocated as transient memory;
    a transient memory data structure indicating transient memory allocated by the second allocating means and not yet deallocated by the second deallocating means; and
    a means for cleaning up all transient memory by deallocating using the second deallocating means all transient memory indicated by the transient memory data structure upon replacement of the software component.

4. A program according to claim 2, wherein the enduring memory data structure is a linked list.

5. A program according to claim 3, wherein the transient memory data structure is a linked list.

6. A program according to claim 1, wherein each enduring memory entry includes an allocation identifier for marking an enduring memory entry, so that the enduring memory entry can be discovered by the software component after replacement.

7. A program according to claim 1, where the software component comprises a software library.

8. A program according to claim 1, where the software component comprises an executable program.

9. A program according to claim 1, where the software component comprises a dynamically linked kernel module.

10. A software system for managing the memory of a replaceable software component, the system comprising:
    a digital computer with memory;
    a means for allocating the memory of the digital computer;
    a means for deallocating memory previously allocated by the allocating means;
    a software component; and
    a means for managing memory for the replaceable software component, the means comprising:
        a second allocating means for allocating a block of memory as enduring memory by use of the first allocating means for use by the software component, a second deallocating means for deallocating a block of memory previously allocated as enduring memory by use of the second allocating means; and an enduring memory data structure indicating enduring memory allocated by the second allocating means and not yet deallocated by the second deallocating means, the enduring memory data structure accessible by the software component after the replacement of the software component, so as to allow the software component access to enduring memory allocated before the replacement.

11. A memory management method for preserving the state of a software component between updates of the software component, the software component available in a first and a second version, the method comprising the steps of:

allocating enduring memory in the first version of the software component;

upgrading to the second version of the software component without freeing the enduring memory and without retaining the first version of the software component; and accessing the enduring memory allocated in the first version of the software component when executing the second version of the software component.

12. A memory management method according to claim 11, wherein the step of allocating enduring memory includes maintaining an enduring memory data structure to manage the allocated enduring memory.

13. A memory management method for preserving the state of a software component between updates of the software component, the software component available in a first and a second version, the method comprising the steps of:

allocating enduring memory in the first version of the software component;

maintaining an enduring memory data structure to manage the allocated enduring memory;

replacing the first version of the software component with the second version of the software component without freeing the enduring memory;

re-establishing a connection between the second version of the software component and the enduring memory by iterating through the enduring memory data structure, so as to make the enduring memory allocated by the first version of the software component available to the second version of the software component; and accessing the enduring memory allocated in the first version of the software component when executing the second version of the software component.

14. A memory management method according to claim 13, wherein the step of using the enduring memory includes locating the enduring memory by using the connection established in the re-establishing step.

15. A memory management method for preserving the state of a software component between updates of the software component, the software component available in a first and a second version, the method comprising the steps of:

allocating enduring memory in the first version of the software component;

allocating transient memory in the first version of the software component;

upgrading to the second version of the software component without freeing the enduring memory;

deallocating all of the transient memory in the first version of the software component; and accessing the enduring memory allocated in the first version of the software component when executing the second version of the software component.

16. A memory management method according to claim 15, wherein:

the step of allocating transient memory in the first version of the software component includes maintaining the transient memory in a data structure; and the step of deallocating the transient memory in the first version of the software component includes iterating through the transient memory data structure to locate all transient memory to be deallocated.

17. A memory management method for preserving the state of a software component between updates of the software component, the software component available in a first and a second version, the method comprising the steps of:

making a first request to allocate enduring memory in the first version of the software component, the first request including an allocation identifier;

allocating an enduring memory block marked with the allocation identifier of the first request;

upgrading to the second version of the software component;

making a second request to allocate enduring memory in the second version of the software component, the second request including an allocation identifier and an indication of a preference for reuse; and if any enduring memory block is marked with an allocation identifier that matches the allocation identifier of the second request, returning the matching enduring memory block, otherwise allocating an enduring memory block marked with the allocation identifier of the second request.

18. A utility to manage the replacement of an implementation library embodied in a computer, the implementation library including one or more state variables, each state variable having a respective value, and the values of the state variables together defining a state of the implementation library, the utility comprising:

a software means for managing the memory allocation of the implementation library so that the state of the implementation library can be restored upon update of the implementation library;

a software means for managing the loading and unloading of implementation libraries while maintaining program correctness; and a service registry including at least one entry for mapping a user application of the implementation library to the implementation library, so that the implementation library can be modified while the user application is executing, thereby enabling the implementation library to be modified while maintaining the state of the implementation library.

* * * * *